(12) United States Patent
Brown (10) Patent No.: US 11,853,972 B1
(45) Date of Patent: Dec. 26, 2023

(54) GREEN TRAINING PROCESS

(71) Applicant: Patrice Brown, Cleveland, OH (US)

(72) Inventor: Patrice Brown, Cleveland, OH (US)

( * ) Notice: Subject to any disclaimer, the term of this patent is extended or adjusted under 35 U.S.C. 154(b) by 31 days.

(21) Appl. No.: 17/069,830

(22) Filed: Oct. 13, 2020

Related U.S. Application Data (63) Continuation-in-part of application No. 15/289,202, filed on Oct. 9, 2016, now abandoned.

(51) Int. Cl.
| | | |
|---|---|---|
| *G06Q 10/10* | (2012.01) | |
| *G06Q 10/06* | (2012.01) | |
| *G09B 19/00* | (2006.01) | |
| *G06Q 10/1053* | (2023.01) | |
| *G06Q 10/0639* | (2023.01) | |

(52) U.S. Cl.
CPC ... *G06Q 10/1053* (2013.01); *G06Q 10/06398* (2013.01); *G09B 19/00* (2013.01)

(58) Field of Classification Search
CPC .............................. G06Q 30/0201; G09B 19/00
See application file for complete search history.

(56) References Cited

U.S. PATENT DOCUMENTS

| | | | | |
|---|---|---|---|---|
| 8,260,628 B2 * | 9/2012 | Lopez | ................... | G06Q 50/08 705/26.1 |
| 2009/0271336 A1 * | 10/2009 | Franks | ................... | G06Q 99/00 290/1 A |
| 2011/0000402 A1 * | 1/2011 | Grasso, Jr. | .............. | C04B 28/04 106/713 |
| 2018/0101853 A1 * | 4/2018 | Brown | ................... | G09B 19/00 |

* cited by examiner

*Primary Examiner* — Michael C Zarroli
(74) *Attorney, Agent, or Firm* — Patrice Brown (57) ABSTRACT

(#1) Green k-12 Curriculum leads to, job readiness, Green Job Trade Skill, Green Residential Repairs & Small Business Training upon Graduation. (#2) The Green Job Training process includes On the Job Training with Multi Generation Green Jobs, Job Readiness, Green Residential Repairs & Small Business Training upon Certification of completion. The Green Training Process leads to manufacturing jobs such as, (#3) Green outside shower invention for portable use for contractors, beaches & remote regions without adequate water. In addition to manufacturing jobs for (#4) Wind turbine Cover invention that protects birds. As well as (#5) Mobile Exercise Bicycle Rack for Bikers and Marathon Riders. In addition to (#6) Mobile Folding Partition for traveling distance learning coaches and educators.

3 Claims, 4 Drawing Sheets

GREEN TRAINING PROCESS

CROSS-REFERENCE TO RELATED APPLICATIONS

Applicant's previously filed applications refrenced herein contain subject matter relevant to the disclosed invention: 61/412,331, 61/445,843, 61/600,045, 61/445,843, 29/498, 417, 29/514,399, 62/157,475, 62/235,879, and 15/289,202.

BACKGROUND OF THE INVENTION

Field of the Invention

Training, Sustainable Products, in a dditon to health and wellness.

Description of Related Art

Problem solved: The K-12 education, often do not lead into green trade or green small buisness with immediate opportunity for income, the educational grades K-12 Green Training Certification Process does. In the current rate of unemployment and layoffs and trainings that often leads to no jobs leads to further despair, the multi-gernationa I educational, Green Job Training Certification Process leads to self-cufficiency skill development that offer the creation of entrepreneurs, and job readiness for a job market.

Those who work as contractors, go to the beach and those in remote regions all have the same issues, nowhere to wash off debris, sometimes chemicals, sand and environmental hazards withou bringing them in your automobiles, homes, or affecting those around them. The Green Outdoor Shower allows for debris and hazardous materials to be washed with limited potable water and lower health risk. Small to medius size wind turbines offer hazards to the protection of our birds, this is a major barrier to entry into the market of manufacturing an djob creations. The Wind Turbine Protective Cover allows a protective shield for birds, lower barriers in the alternative energy market and create jobs. Mobile bicycle folding exercise rack for bikers and marathod riders. Mobile folding partition for traveling distance learning coaches and educators.

Currently, K-12 curriculum does not address the educational and workforce developmental needs and skills in the green industry that leads students into employment or their own small business.

Training programs offered requires indiviuals to learn a skill in other fields that may take months or years to earn an income. The current ourside showers require potable water, which limits access to showering. The current wind turbine coverings are for smaller compact wind turbine ventilations. Currently, there are no mobile bicycle folding exercise rackfor bikers and marathon riders. Currently there are no mobile folding partition for traveling distance learning coaches and eductors.

BRIEF SUMMARY OF THE INVENTION

Educational Green k-12 Training Certification Process leads to job readiness/workforce development, GreenJ ob Trade Skill sets, Urban Gardening, Green Residential Repairs, Green Small Business Training upon seeking a High School Diploma or equivalency. Multi-Generational Educational Green Job Training Certification Process (also for On the Job Training) with GreenJobs Readiness, Urban Gardening, Green Residential Repairs and Green Small Business Training upon seeking a Green Industry Career. Both Green Training Processes are narrowed down into three categories, Eco-Education, Employment and Entrepreneurship Training in person and online instructional methods. In addition to manufacturing jobs for Green outside shower for portable use for contractors, beaches & remote regions without adequate water. Wind turbine Cover invention that protects birds. As well as, Mobile Bicycle Folding Exercise Rackfor Bikers and Marathon Riders. In addition to Mobile Folding Partition for traveling dista nce learning coaches and educators.

DETAILED DESCRIPTION OF THE INVENTION

As stated above, Current, k-12 education, often do not lead into Green Trade or Green Small Business with immediate opportunity for income. In the current rate of unemployment and layoffs and trainings that often leads to no jobs leads and further despair, with limited GreenJob Training Process of on the job training/workforce development. Those who work as Contractors, go to the beach and those in remote regions all have the same issues, nowhere to wash off debris, sometimes chemicals, sand, and environmental hazards without bringing them in your automobiles, homes or affecting those around. As shown in multiple views FIGS. 1-2C, a green outdoor shower has a portable plastic outdoor shower privacy shelter, with an expansion funnel shower head and water suction pump connected to a water barrel and a plastic pedal pump connected to an expansion funnel connection inside the water barrel. Whereby, the pedal pump suctions water from the barrel and sprays the water out the funnel head into the outdoor shower privacy shelter.

Figure 4A:
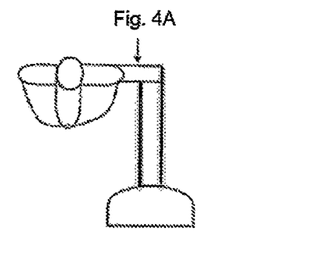
FIG. 4A is a partial view of the wind turbine and protective cover.
Figure 4B:
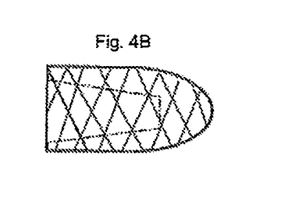
FIGS. 4B & 4C are a top and bottom protective cover, respectively.
Figure 4C:
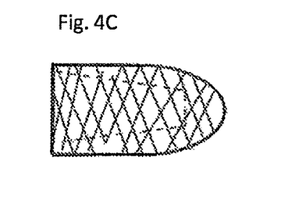

Small to medium size wind turbines offer hazards to the protection of our birds, this is a major barrier to entry into the market of manufacturing and job. FIGS. 4A, 4B & 4C show a wind turbine bird protective cover having steel or plastic netting that can be connected to each blade of the wind turbine. The netting is composed of sections arranged in either vertical horizontal cross stitching or sections arranged in an angle across stitching. The covering is further comprised of top and bottom covers held together with steel or plastic clamps.

Figure 5:
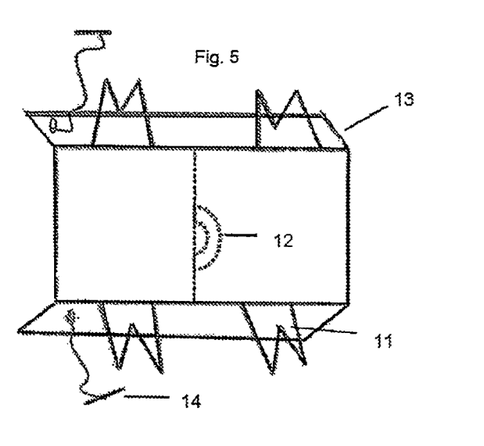
FIGS. 5, 6, 7 show a foldable mobile exercise bicycle rack having hinges that enable the rack to be folded up upon itself into a carrying case (FIG. 6) and carried with plastic or steel handles.
Figure 6:
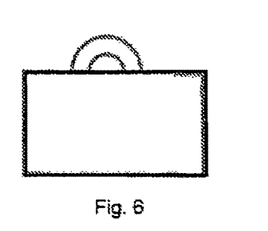
Figure 7:
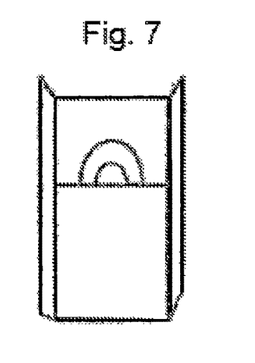

Due to raining and cold weather conditions Bike and Marathon Riders can exercise in hotels with Mobile Bicycle Exercise Folding Partition shown in FIGS. 5-7. Traveling, distance learning coaches and educators can train online in Hotel with Mobile Folding Partition shown in FIGS. 8-10.

The Educational Green k-12 Training Certification Process will teach students job training, Urban Gardening, Green Residential Repairs, Green and or Small Business Trade to obtain income generation with less length of time. The Multi-Generational, Educational Green Job Training Certification Process, Youth and Adult program allows individuals with a sixth grade education to prepare for the green jobs of today and healthy sustainable skill sets, Job readiness/workforce development and Green Residential Repairs Training, that leads them to several Green jobs areas of employment for internships, temporary employment, permanent employment, the options to start their own Green Business, in addition to On the Job Training.

Those who work as Contractors, go to t he beach and those in remote regions all have the same issues, nowhere to wash off debris, sometimes chemicals, sand, and environmental hazards without bringing them in your automobiles, homes or affecting those around them, The Green Outdoor Shower allows for debris and hazardous materials to be washed with limited potable water and lower health risk. Small to medium size wind turbines offer hazards to the protection of our birds, this is a major barrierto entry into the market of manufacturing and job creations. The Wind Turbine Protective Cover allows a protective shield for birds, lower barriers in the Alternative Energy Market and create jobs. The mobile Bicycle Folding Exercise Rack is for Bikers and Marathon Riders. The Mobile Folding Partition is for traveling distance learning coaches and educators.

The structure and certification process differs from what currently exists. Other, k-12 Curriculum does not lead into Green Trade or Small Business. OtherJob Training Courses rely on other outside factors to provide jobs and employment this invention provides jobs and training based on individual's skill sets and goals as well as a transfer of those skills into Green job and or Business opportunities within the training with Green Job Training Process with On The Job Training. This Green outdoor Portable Shower will allow for those that work in Contracting, attend beaches and in remote regions to shower and wash off debris to lower health risk associated with the transfer of environmental concerns. Wind turbine cover will lower the barriers of entry into the market, and protect. Due to raining and cold weather conditions Bike and Marathon Riders can exercise in hotels with Mobile Bicycle Exercise Folding Partition. Traveling, distance learning coaches and educators can train online in Hotel with Mobile Folding Partition.

Figure 3:
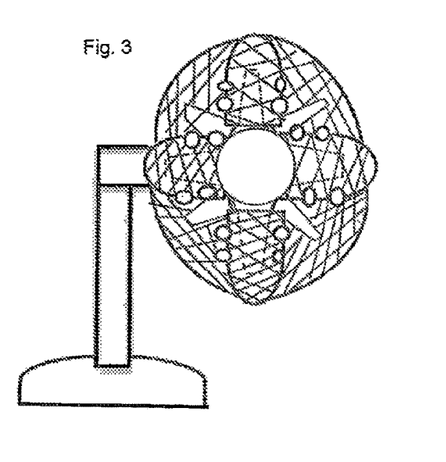
FIG. 3 is a wind turbine with protective cover.
Figure 8:
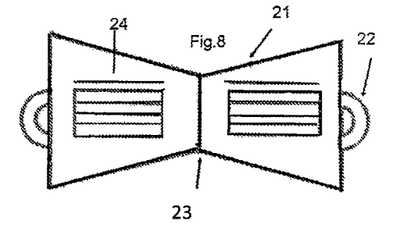
FIGS. 8, 9, 10 show a foldable mobile partition having hinges that enable the partition to be folded up upon itself into a carrying case (FIG. 9) and having plastic or steel handles and partition side file pocketing.
Figure 9:
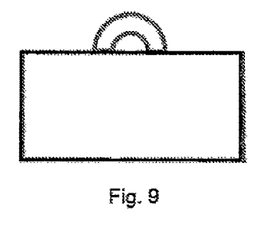
Figure 10:
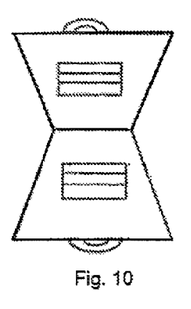

The Educational k-12 Green Training Certification Process and The Multi-Generational, Educational GreenJob Training Certification Process provide Students, individuals and employees, with Green Job readiness, Green Small Business and healthy life Style Skill Sets for Employment, Careers and Business opportunity for today's Green Market Job Industry. In addition, Other Green Outside showers use conventional water systems that require potable water. This invention will require low to no potable water. Other wind turbines covers offer ventilators, this cover offers covering for stand-alone larger size wind turbine for manufacturing that lower barrier to entry into the market for job as shown in FIG. 3. As shown in FIGS. 5-7, currently, there are no Mobile Bicycle Folding Exercise Rack for Bikers and Marathon Riders. Currently there are no Mobile Folding Partition for traveling distance learning coaches and educators as shown in FIGS. 8-10.

This is an improvement on what currently exists.

Current, k-12 Curriculum offer trades in other industries, without the employment opportunities leads into Green internships, Temporary labor, permanent jobs, Green small businesses for students to immediately start making income with contractible, Green Job Training Certification Process to use for On The Job Training. Adult training programs offer longer lengths of time to earn an income through learning an additional trade, applying for employment with chances of experiencing additional layoffs with limited new Green Job Training for on the Job Training use. Other Green Outside showers use conventional water systems that require potable water this invention will require low to no potable water. Other wind turbines covers offer ventilators, this cover offers covering for standalone larger size wind turbine for manufacturing that lower barrier to entry into the market for job creation. Currently, there are no Mobile Bicycle Folding Exercise Rack for Bikers and Marathon Riders. Currently there are no Mobile Folding Partition for traveling distance learning coaches and educators.

This Educational Green K-12 Training Certification Process provides students with job readiness/workforce development, Urban Agriculture, Green Residential Repairs, and small business skills to immediately start making an income. The Multi-Generational, Educational Green Job Training Certification Process invention provides an individual with a sixth grade learning level skills to obtain employment in a GreenJob, Small Business and Green Residential Repairs Training, to take their skill sets and transfer them into income generating skills with or without contingency of employment from alternate outside factors, using assessment tools to build upon the skills already obtained to contract services based upon experience through for On The Job Training. Current outside showers has limited Outdoor Showers, access and are often unsanitary. The current wind turbine ventilators do not address the standalone wind turbines, their barrier to market entry due to the safety of birds. Currently, there are no Mobile Bicycle Folding Exercise Rack for Bikers and Marathon Riders. Currently there are no Mobile Folding Partition for traveling distance learning coaches and educators.

Problem Solved: The K-12 education, often do not lead into Green Trade or Green Small Business with immediate opportunity for income, the Educational k-12 Green Training Certification Process does. In the Current rate of unemployment and layoffs and trainings that often leads to no jobs leads to further despair, The Multi-Generational Educational, Green Job Training Certification Process leads to self-sufficiency skill development that offer the creation of Entrepreneurs, and job readiness for a Job market. Those who work as Contractors, go to the beach and those in remote regions all have the same issues, nowhere to wash off debris, sometimes chemicals, sand, and environmental hazards without bringing them in your automobiles, homes or affecting those around them. The Green Outdoor Shower allows for debris and hazardous materials to be washed with limited potable water and lower health risk. Small to medium size wind turbines offer hazards to the protection of our birds, this is a major barrier to entry into the market of manufacturing and job creations. The Wind Turbine Protective Cover, allows a protective shield for birds, lower barriers in the Alternative Energy Market and create jobs. Mobile Bicycle Folding Exercise Rack are for Bikers and Marathon Riders. Mobile Folding Partition are for traveling distance learning coaches and educators.

Currently, k-12 Curriculum does not address the educational and workforce developmental needs and skills in the Green Industry that leads students into employment or their own small business. Training programs offered requires individuals to learn a skill in other fields that may take months or years to earn and income. The current outside showers require potable water, which limits access to showering. The current Wind turbine coverings are for smaller compact wind turbine ventilators. Currently, there are no Mobile Bicycle Folding Exercise Rack for Bikers and Marathon Riders. Currently there are no Mobile Folding Partition for traveling distance learning coaches and educators.

The Educational Green k-12, Training Certification Process provides students with, Job readiness workforce development, Urban Gardening, Green Residential Repairs, Green Training and small business skills to immediately start making an income. Multi- Generational Educational GreenJob Training Certification Process provides an individual with a sixth-grade learning level skills to obtain employment in a Green Job, Job readiness, Small Business and Green Residential Repair Training, to take their skill sets and transfer them into income generating skills with or without contingency of employment from alternate outside factors, and On the Job Training/Workforce skill Development. In addition, the Green outdoor shower will allow outside showering to be transportable to construction sites, beaches and remote regions where potable water has limited accessibility. This Wind turbine Covering will allow stand-alone Wind turbines bird protection from the blades. Mobile Bicycle Bike Folding Exercise Rack is for Bikers and Marathon Riders Mobile Folding Partition is for traveling distance learning coaches and educators.

Educational Green k-12 Training Certification Process leads to job readiness/workforce development, GreenJob Trade Skill sets, Urban Gardening, Green Residential Repairs, Green Small Business Training upon seeking a High School Diploma or equivalency. Multi- Generational Educational Green Job Training Certification Process (also for On the Job Training) with GreenJobs Readiness, Urban Gardening, Green Residential Repairs and Green Small Business Training upon seeking a Green Industry Career. Both Green Training Processes are narrowed down into three categories, Eco- Education, Employment and Entrepreneurship Training in person and online instructional methods. In addition to manufacturing jobs for the Green outside shower for portable use for contractors, beaches & remote regions without adequate water; the Wind turbine Cover that protects birds; as well as, a Mobile Bicycle Folding Exercise Rackfor Bikers and Marathon Riders and a Mobile Folding Partition for traveling distance learning coaches and educators.

As stated above, current, k-12 education, often do not lead into Green Trade or Green Small Business with immediate opportunity for income. In the Current rate of unemployment and layoffs and trainings that often leads to no jobs leads and further despair, with limited GreenJob Training Process of on the job training/workforce development. Those who work as Contractors, go to the beach and those in remote regions all have the same issues, nowhere to wash off debris, sometimes chemicals, sand, and environmental hazards without bringing them in your automobiles, homes or affecting those around. Small to medium size wind turbines offer hazards to the protection of our birds, this is a major harrier to entry into the market of manufacturing and job. Due to raining and cold weather conditions Bike and Marathon Riders can exercise in hotels with Mobile Bicycle Exercise Folding Partition. Traveling, distance learning coaches and educators can train online in Hotel with Mobile Folding Partition.

The invention discussed below solves this problem.

The Educational Green k-12 Training Certification Process will teach students job training, Urban Gardening, Green Residential Repairs, Green and or Small Business Trade to obtain income generation with less length of time. The Multi-Generational, Educational Green Job Training Certification Process, Youth and Adult program allows individuals with a sixth grade education to prepare for the green jobs of today and healthy sustainable skill sets, Job readiness/workforce development and Green Residential Repairs Training, that leads them to several Green jobs areas of employment for internships, temporary employment, permanent employment, the options to start their own Green Business, in addition to On the Job Training. Those who work as Contractors, go to the beach and those in remote regions all have the same issues, nowhere to wash off debris, sometimes chemicals, sand, and environmental hazards without bringing them in your automobiles, homes or affecting those around them, The Green Outdoor Shower allows for debris and hazardous materials to be washed with limited potable water and lower health risk. Small to medium size wind turbines offer hazards to the protection of our birds, this is a major barrier to entry into the market of manufacturing and job creations, The Wind Turbine Protective Cover, allows a protective shield for birds, lower barriers in the alternative energy market and create jobs. Mobile bicycle folding exercise rack for bikers and marathon riders and mobile folding partition for traveling distance learning coaches and educators.

The invention differs from what currently exists.

Other, K-12 Curriculum does not lead into Green Trade or Small Business. Other Job Training Courses rely on other outside factors to provide jobs and employment this invention provides jobs and training based on individual's skill sets and goals as well as a transfer of those skills into Green job and or Business opportunities within the training with Green Job Training Process with On the Job Training. This Green outdoor Portable Shower will allow for those that work in Contracting, attend beaches and in remote regions to shower and wash off debris to lower health risk associated with the transfer of environmental concerns. Wind turbine cover will lower the barriers of entry into the market, and protect. Due to raining and cold weather conditions Bike and Marathon Riders can exercise in hotels with Mobile Bicycle Exercise Folding Partition. Traveling, distance learning coaches and educators can train online in Hotel with Mobile Folding Partition. The Educational K-12 Green Training Certification Process and the Multi-Generational, Educational GreenJob Training Certification Process provide students, individuals and employees, with green job readiness, green small business and healthy life style skill sets for employment, careers and business opportunity for today's green market job industry. In addition, other green outside showers use conventional water systems that require potable water. This invention will require low to no potable water. Other wind turbines covers offer ventilators, this invention offers covering for stand-alone larger size wind turbine for manufacturing that lower barrier to entry into the market for job.

Currently, there are no Mobile Bicycle Folding Exercise Rack for Bikers and Marathon Riders. Currently there are no Mobile Folding Partition for traveling distance learning coaches and educators.

This invention is an improvement on what currently exists.

Current, k-12 Curriculum offer trades in other industries, without the employment opportunities leads into Green internships, Temporary labor, permanent jobs, Green small businesses for students to immediately start making income with contractible, Green Job Training Certification Process to use for On The Job Training. Adult training programs offer longer lengths of time to earn an income through learning an additional trade, applying for employment with chances of experiencing additional layoffs with limited new Green Job Training for on the Job Training use. Other Green Outside showers use conventional water systems that require potable water this invention will require low to no potable water. Other wind turbines covers offer ventilators, this invention offers covering for standalone larger size wind turbine for manufacturing that lower barrier to entry into the market for job creation. Currently, there are no Mobile Bicycle Folding Exercise Rack for Bikers and Marathon Riders. Currently there are no Mobile Folding Partition for traveling distance learning coaches and educators.

This Educational Green k-12 Training Certification Process provides students with job readiness/workforce development, Urban Agriculture, Green Residential Repairs, and small business skills to immediately start making an income. The Multi-Generational, Educational GreenJob Training Certification Process invention provides an individual with a sixth grade learning level skills to obtain employment in a GreenJob, Small Business and Green Residential Repairs Training, to take their skill sets and transfer them into income generating skills with or without contingency of employment from alternate outside factors, using assessment tools to build upon the skills already obtained to contract services based upon experience through for On The Job Training. Current outside showers have limited outdoor showers, access and are often unsanitary. The current wind turbine ventilators do not address the standalone wind turbines, their barrier to market entry due to the safety of birds. Currently, there are no Mobile Bicycle Folding Exercise Rack for Bikers and Marathon Riders. Currently there are no Mobile Folding Partition for traveling distance learning coaches and educators.

The Educational Green Training Certification Process provides students with Job Readiness, Green Training and small business skills to immediately start making an income.

The Multi-Generational, Educational Green Job Training Process invention provides an individual with a sixth-grade learning level skills to obtain employment in a Green Job, Small Business and Training, to take their skill sets and transfer them into income generating skills with or without contingency of employment from alternate outside factors, the Training Process also used for On The Job Training. This invention will allow Outside Showering to be transportable to Construction Sites, Beaches and remote regions where potable water has limited accessibility. This Wind turbine Covering will allow stand-alone Wind turbines bird protection from the blades. Due to raining and cold weather conditions Bike and Marathon Riders can exercise in hotels with Mobile Bicycle Exercise Folding Partition. Traveling, distance learning coaches and educators can train online in Hotel with Mobile Folding.

Also, it can produce.

The Educational Green k-12 Training Certification Process and The Multi-Generational, Educational GreenJob Training Certification Process will provide students, individuals and employees, with GreenJob readiness, Urban Gardening, Green Residential Repairs, Green Small Business, as well as, healthy life Style Skill Sets to work to create access to nutritional foods in their community. In addition, to gaining the necessary skills sets for Employment, Careers and Business opportunities for today's 21 Century Green Job Market Industry. Green Outdoor Shower (Plastic Shower Connection & Shelter) and Wind turbine Protective Covering, Mobile Bicycle Exercise Folding Partition, and Mobile Folding Partition are products that can produce manufacturing products and jobs. Due to raining and cold weather conditions Bike and Marathon Riders can exercise in hotels with Mobile Bicycle Exercise Folding Partition. Traveling, distance learning coaches and educators can train online in Hotel with Mobile Folding Partition.

The version of the invention discussed here includes: A green educational curriculum and a green job training certification process for individuals 18 years and older that includes four assembly projects comprising; A green outdoor shower assembling, a green outdoor shower module comprising the steps of; attaching a portable plastic outdoor shower privacy shelter, to an expansion funnel shower head; next, connecting the shower head to a water suction pump that is in turn connected to a water barrel; attaching a plastic pedal pump to the expansion funnel shower head; connecting the water from the barrel to the pedal pump such that the water is sprayed out the funnel head into the outdoor shower privacy shelter; a wind turbine protective covering attaching a protective cover to a wind turbine comprising the steps of; attaching steel or plastic netting to each blade of the wind turbine; the netting is composed of sections arranged in either vertical horizontal cross stitching or sections arranged in an acute angle cross stitching; the covering is further comprised of top and bottom covers held together with steel or plastic clamps; a mobile exercise bicycle rack where assembling a foldable mobile exercise bicycle rack comprising the steps of the bicycle rack includes hinges that enable the rack to be folded up upon itself and; attaching plastic or steel handles to the rack and a mobile folding partition including assembling a foldable mobile partition comprising; the partition includes hinges that enable the partition to be folded up upon itself; attaching plastic or steel handles and; attaching a partition side file pocketing.

The educational process comprising a GREEN K-12 TRAINING CERTIFICATION PROCESS: Green, Eco-Educational, Employment and Entrepreneur Training, Study Guide Included, Training Presented, In Person and Online having Educational, Green k-12 Registration; Green K-8, Training, No Certification Involved; Green 9-12 Grades Individual Needs & Goals Assessment; Green 9-12 Grades Job Training and Workforce Development Training; Green 9-12 Grades Personal and Professional Development Training; Green 9-12 Grades Green Electives, including Urban Gardening, Green Residential Repairs, and Green Small Business Training, Green Training Assessment and Survey, Diploma and Certification of Completion and Mentorship Program, Internship, College Referral Program.

The educational process comprising a GREEN JOB TRAINING CERTIFICATION PROCESS: Green, Eco-Educational, Employment and Entrepreneur Training, Study Guide Included, Training Presented, In Person and Online including Registration for the Educational, Green Training Certification Process, Do an Individual Needs & Goals Assessment, Job Training and Workforce Development Training, Personal and Professional Development Training, Green Customized Career Planning including Urban Gardening, Green Residential Repairs Training, and Green Small Business Training f. Green Training Assessment and Survey, Mentorship Tracking Program a nd Certification of Completion, Green Job, Internship, Temporary Labor and Permanent Labor, Green Contracting, Urban Gardening Consultant, Network Marketing, Internet Marketing, Janitorial, Paint Recycling, Independent Contracting, and Green Residential Rehabilitation (Automatic Lights and Plumbing Fixtures), and Manufacturing.

Elements of the Invention

Step 1: Educational, Green k-12 Training Certification Process Introduction
Step 2: Green k-12 Registration
Step 3: Green k-8 Electives, No Certification Involved "Urban Gardening and Healthy Eating" Healthy Cooking
Step 4: Green 9-12 Grades Individual Needs & Goals Analysis
Step 5: Green 9-12 Grades Job and Workforce Development Training
Step 6: Green 9-12 Grades Personal, Professional Development Training
Step 7: Green 9-12 Grades Electives including "Urban Gardening" and "Green Residential Repairs" Green Small Business Training
Step 8: Green Training Assessment and Survey
Step 9: Diploma and Certification of Completion
Step 10: Mentors hip Program, Internship, College Referral Program
Step 11: Multi-Generational, Educational, Green Job Training Certification Process Introduction
Step 12: Green Job Training Process Registration
Step 13: Green Individual Needs & Goal Assessment
Step 14: GreenJobs and Workforce Development Training
Step 15: Green Personal, Professional Development Training
Step 16: Green Customized Career Planning including "Urban Gardening" and "Green Residential Repairs" Green Small Business Training
Step 17: Green Training Assessment and Survey
Step 18: Mentors hip Tracking Program and Certification of Completion
Step 19: GreenJob, Internship, Temporary, Permanent & Labor
Step 20: Green Contracting, Urban Gardening Consultant, Network Marketing, Internet Marketing, Janitorial, Paint Recycling, Independent Contracting, Green Residential Rehabilitation (Automatic Lights and Plumbing Fixtures), and Manufacturing, such as a green educational curriculum and a green job training certification process for individuals' years and older that includes four assembly projects.
Step 21: A green educational curriculum and green job training certification process for individuals' years and older that includes assembly projects including modules on assembling a green outdoor shower, a wind turbine protective cover, a mobile bicycle exercise rack and a mobile folding partition.

Figure 1A:
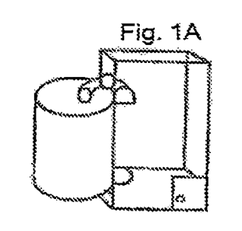
FIGS. 1A, 1B are multiple views of the Green outdoor shower.
Figure 1B:
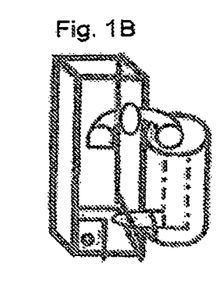
Figure 2A:
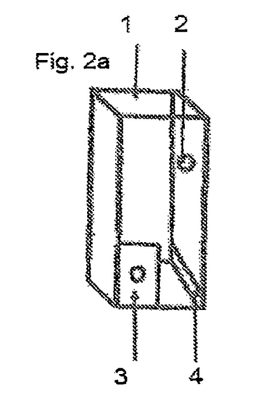
FIG. 2A, 2B & 2C: A green outdoor shower showing a portable plastic outdoor shower privacy shelter, with an expansion funnel shower head and water suction pump connected to a water barrel and a plastic pedal pump connected to an expansion funnel connection inside the water barrel.
Figure 2B:
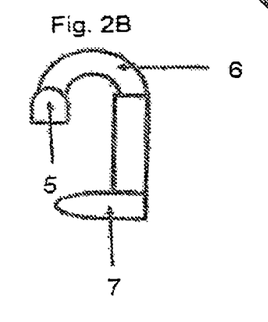
Figure 2C:
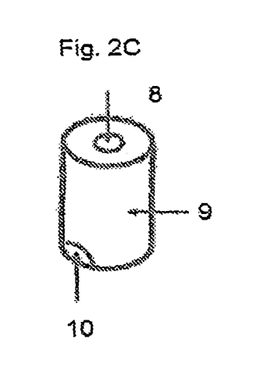

The green outdoor shower assembling a green outdoor shower module comprising the steps of; attaching a portable plastic outdoor shower privacy shelter, to an expansion funnel shower head; next, connecting the shower head to a water suction pump that is in turn connected to a water barrel; attaching a plastic pedal pump to the expansion funnel shower head; connecting the water from the barrel to the pedal pump such that the water is sprayed out the funnel head into the outdoor shower privacy shelter. FIG. 1 Water Barrel shown on the right side of the outdoor shower privacy shelter. FIG. 2 Water Barrel shown on the left side of the outdoor shower privacy shelter.

The green outdoor shower reference numeral invention description includes Green Outdoor Privacy Shelter (1), Hole/Shower Extension (2), Hole/Peddle Pump--(Privacy Shelter)(3), Water Ventilation/Drainage Cleaning (4), Shower Head (5), Nozzle Extension (6), Peddle Pump (7), Hole/Peddle Pump (8), Water Barrel (9), and Hole/Peddle Pump (Water Barrel) (10).

The wind turbine protective covering attaching a protective cover to a wind turbine comprising the steps of attaching steel or plastic netting to each blade of the wind turbine. Netting composed of sections arranged in either vertical horizontal cross stitching or sections arranged in an acute angle cross stitching. The covering is further comprised of top and bottom covers held together with steel or plastic clamps.

Figure 4D:
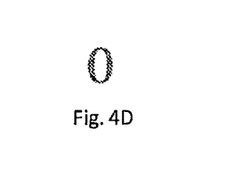
FIG. 4D shows a blade cover metal-steel clamp.

FIG. 3 is the wind turbine protective cover view of complete assembly to display to full enclosure of the blades. FIG. 4A shows the wind turbine protective cover partially assembled to display the enclosure of the blades. FIGS. 4B, 4C and 4D show a top protective cover, a bottom protective cover and a metal-steel clamp.

Mobile Exercise Bicycle Rack assembling a foldable mobile exercise bicycle rack comprising the steps of; the bicycle rack includes hinges that enable the rack to be folded up upon itself and; attaching plastic or steel handles to the rack. FIG. 5 shows the mobile bicycle exercise rack displayed open for use view.

Mobile Bicycle Exercise Rack displays the folded carrying view in FIG. 6. Mobile Bicycle Exercise Rack displays the partially open for use view in FIG. 7.

Mobile Bicycle Exercise Rack description of reference numerals include Mobile Bike Rack (11), Handle Clamps (12), Folding Side Clamps (13), and Exercise Strap Attachments (14).

The module for the mobile folding partition includes assembling a foldable mobile partition comprising; the partition includes hinges that enable the partition to be folded up upon itself; attaching plastic or steel handles and; attaching a partition side file pocketing. The mobile folding partition displays the open ready for use view in FIG. 8. The mobile folding partition displays the folded mobile view in FIG. 9. The mobile folding partition displays the preparation for closure in FIG. 10.

Reference to the mobile folding partition-parts description is plastic mobile partition (21), plastic carrying handles (22), folding hinges (23) and filing slots (24).

How the Invention Works: Steps 1-9: An educational, Green k-12 Training Certification Process will allow students a job, career of college preparation in the Green Industry. Steps 11-18: Multi-Generational, educational GreenJob Training Certification Process will allow individuals both the preparation for a GreenJob and Green Small business within the Green Industry, and On the Job Training Development opportunities. Both Steps 9-10 The educational Green k-12 Training Certification Process and Steps 18-20 Multi-Generational, educational GreenJob Training Certification Process are based upon the successful completion of Steps of the prior steps involved in the training processes. Steps 9-10 are based upon the successful completion of Steps 1-8. Steps 18-21 are based upon the successful completion of Steps 11-17. Steps 21 Green Outdoor Shower, Wind turbine Protective Covering, Mobile Bicycle Exercise Folding Rack, and Mobile Folding Partition. Steps 21 Green Outdoor Shower will allow for jobs, product sales, health safety practices through having greater accessibility to showers. Step 21 are based upon the connection to an outdoor Privacy portable Showering Shelter (Like portapotty) and connection to water barrel (like Rain barrel). Step 21 Wind turbine Protective Covering product sales, will lower barriers to entry into the market, protect the birds, and create jobs. Step 21 will require Plastic or Steel Manufacturing of Wind turbine Protective Coverings. Step 21 mobile bicycle exercise folding rack for bikers and marathon riders with folding hinges made of plastic with plastic or metal handles, step 21 mobile folding partition for traveling distance learning coaches and educators with Folding Hinges made of plastic with plastic or metal handles and pockets for files.

How to Make the Invention: Steps 1-10 The Educational Green k-12 Training Certification Process and Steps 11-20 Multi-Generational, Educational Green Job Training Certification Process can become licensed, for use for in person or online training purposes. Steps 1,2 and 4-10 The Educational Green k-12 Training Certification Process and Steps 11-18 Multi-Generational, Educational GreenJob Training Certification Process are necessary elements fortraining and building Human Capital. Steps 10 The Educational Green k-12 Training Certification Process and Steps 19 & 20 Multi-Generational, Educational GreenJob Training Certification Process are important, yet optional elements. The elements to make product better is Information Technology, and employment for those in specified fields. Steps 1,2 and 4-8, the Educational Green k-12 Training Certification Process are elements that are interchangeable with Steps 11-17 multi-generational, educational green job training certification process. Steps 9 and 10 The Educational Green k-12 Training Process and Steps 18-20 Multi-Generational, Educational Green Job Training Certification Process are reconfigured based upon age and academic enrollment status. Steps 1-10 & 11-18 are necessary elements for training and Human Capital. Steps 20 Multi-Generational, Educational Green Job Training Certification Process and Steps (21) are necessary elements for job creation. Steps 10 & 19-20 are optional elements. The elements to make product better is Human Capital, Sales Marketing Team and employment for those in specified fields.

Steps 4-10 and 6-11 are elements that are interchangeable with Steps 13-19. Steps 9 and 18 are reconfigured based upon age and academic enrollment status. Steps 21 prototype will be made through a prototype company, college or university; final products will be made through manufacturing plant. Steps 21 green outdoor shower assembling a green outdoor shower module comprising the steps of; attaching a portable plastic outdoor shower privacy shelter, to an expansion funnel shower head; next, connecting the shower head to a water suction pump that is in turn connected to a water barrel; attaching a plastic pedal pump to the expansion funnel shower head connection inside the water barrel; connecting the water barrel to the pedal pump and such that the water is sprayed out the funnel head into the outdoor shower privacy shelter. Step 21 further includes wind turbine protective covering providing a attaching a wind turbine, a green protective cover to a wind turbine comprising the steps of; attaching steel or plastic netting connecting to each blade of the wind turbine; the netting is composed of sections arranged in either vertical horizontal cross stitching or sections arranged in an acute angle cross stitching; the covering is further comprised of top and bottom covers held together with steel or plastic clamps. Steps 21 mobile exercise bicycle rack assembling a foldable mobile exercise bicycle rack comprising the steps of; the bicycle rack includes hinges that enable the rack to be folded up upon itself and; attaching plastic or steel handles to the rack and Step 21 mobile folding partition assembling a foldable mobile partition comprising; the partition includes hinges that enable the partition to be folded up upon itself; attaching plastic or steel handles and; attaching a partition side file pocketing.

How to Use the Invention: The Educational Green k-12 Training Certification Process, a person can. purchase a contract to facilitate in their Academic Environments (i.e. Schools, Youth Programs, After School, Summer Program). Multi-Generational, Educational GreenJob Certification Training Process, a person can purchase a contract to facilitate training in their organization or for private use, Academic Environment or Business (i.e. Coaches, Non-profits, Colleges or Universities, Business Organizations).

Both The Educational Green k-12 Training Certification Process and Multi-Generational, Educational GreenJob Training Certification Process can be done through in person instructional methods or online. Steps 1-19: The Educational Green k-12 and Multi- Generational, Educational Green Job Training Certification Process can be done through technology and online. Steps 21 Green Outdoor Shower, a person can purchase the Merchandise or product and locate on a Construction Site, Beach or remote regions to make a healthy environmental impact. Step 21 wind turbine protective cover, a person can purchase an order for customized coverings based upon size, of wind turbine and blade length. Step 21 mobile bicycle exercise folding rack for bikers and marathon riders with folding hinges made of plastic with plastic or metal handles. Step 21 mobile folding partition for traveling distance learning coaches and educators with folding hinges made of plastic with plastic or metal handles and pockets for files. Steps 21 products, purchasing orders can be done through technology and online.

The invention claimed is:

1. A green educational curriculum and a green job training certification process that includes four assembly projects comprising;
    assembling a green outdoor shower module comprising the steps of;
        attaching a portable plastic outdoor shower privacy shelter to an expansion funnel shower head;
        next, connecting the shower head to a water suction pump that is in turn connected to a water barrel;
    attaching a plastic pedal pump to the expansion funnel shower head;
    connecting the water barrel to the pedal pump such that water is sprayed out the funnel head into the outdoor shower privacy shelter:
    attaching a protective cover to a wind turbine comprising the steps of;
        attaching steel or plastic netting to each blade of the wind turbine;
        the netting is composed of sections arranged in either vertical horizontal cross stitching or sections arranged in an acute angle cross stitching;
        the covering is further comprised of top and bottom covers held together with steel or plastic clamps:
    assembling a foldable mobile exercise bicycle rack comprising the steps of;
        the bicycle rack includes hinges that enable the rack to be folded up upon itself and;
        attaching plastic or steel handles to the rack and:
    assembling a foldable mobile partition comprising;
        the partition includes hinges that enable the partition to be folded up upon itself;
        attaching plastic or steel handles and;
        attaching a partition side file pocket.

2. A green educational curriculum and a green job training certification process of claim 1 further comprising a GREEN K-12 TRAINING CERTIFICATION PROCESS comprising;
   providing a Green, Eco-Educational, Employment and Entrepreneur Training, Study Guide presenting training In Person and Online further comprising;
   a. Green k-12 Registration
   b. Green K-8, Training, No Certification Involved
   c. Green 9-12 Grades Individual Needs and Goals Assessment
   d. Green 9-12 Grades Job Training and Workforce Development Training
   e. Green 9-12 Grades Personal and Professional Development Training
   f. Green 9-12 Grades Green Electives,
      1. Urban Gardening
      2. Green Residential Repairs
      3. Green Small Business Training
   g. Green Training Assessment and Survey
   h. Diploma and Certification of Completion
      1. Mentorship Program, Internship, College Referral Program.

3. A green educational curriculum and a green job training certification process of claim 1 further; comprising providing a GREEN JOB TRAINING CERTIFICATION PROCESS for individuals 18 years and older comprising Green, Eco-Educational, Employment and Entrepreneur Training, induding a Study Guide presenting training In Person and Online;
   a. Registration for the Green Training Certification Process
   b. Do an Individual Needs & Goals Assessment
   c. Job Training and Workforce Development Training
   d. Personal and Professional Development Training
   e. Green Customized Career Planning
      2. Urban Gardening
      3. Green Residential Repairs Training
      4. Green Small Business Training
   f. Green Training Assessment and Survey
   g. Mentorship Tracking Program and Certification of Completion
   h. Green Job, Internship, Temporary Labor and Permanent Labor
      5. Green Contracting, Urban Gardening Consultant, Network Marketing, Internet Marketing, Janitorial, Paint Recycling, Independent Contracting, and
      6. Green Residential Rehabilitation, Automatic Lights and Plumbing Fixtures, and Manufacturing.

\* \* \* \* \*